D'ORSAY McCALL WHITE.
HYDROCARBON MOTOR.
APPLICATION FILED NOV. 26, 1915.
1,381,150.
Patented June 14, 1921.
3 SHEETS—SHEET 1.
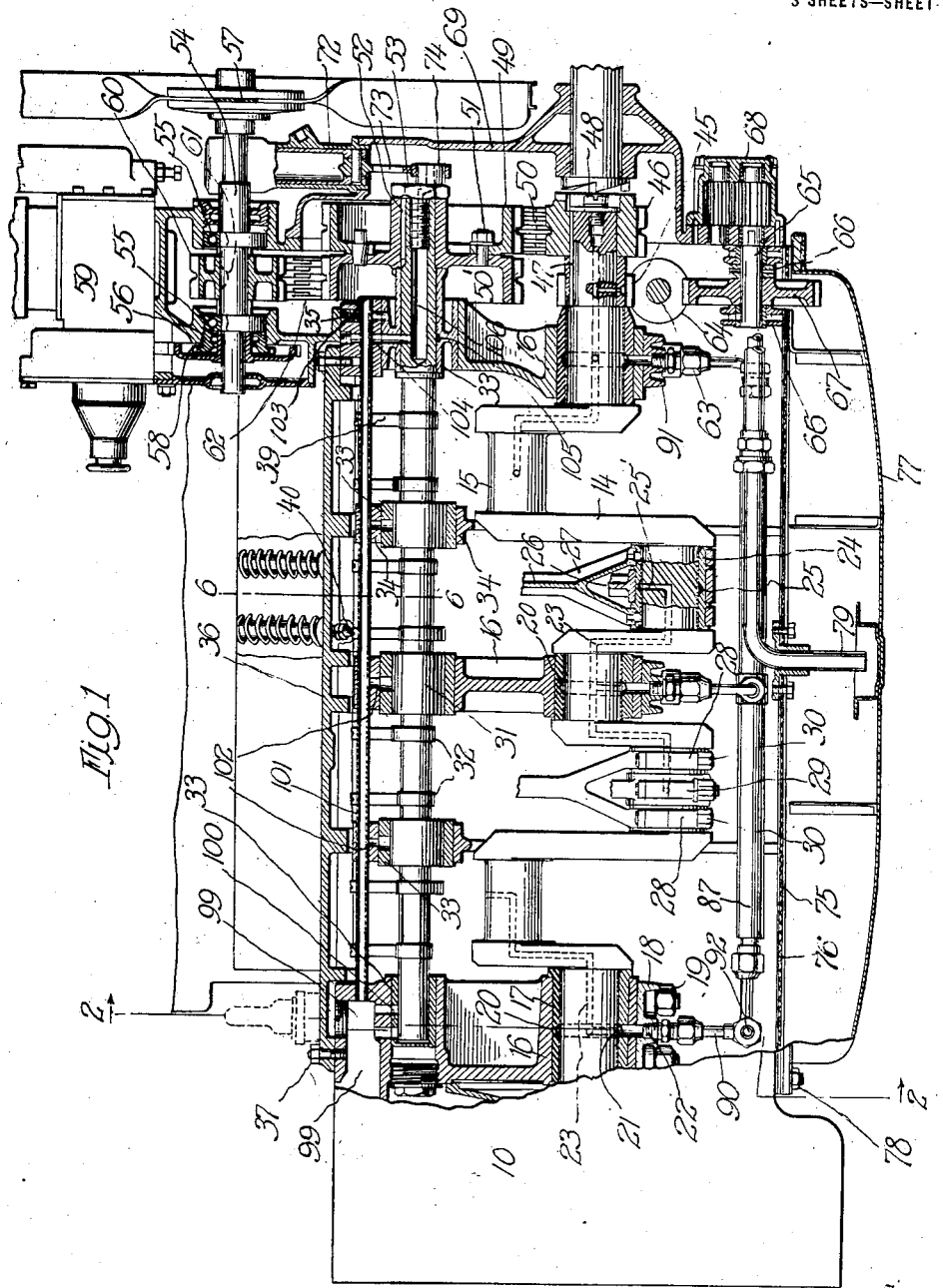

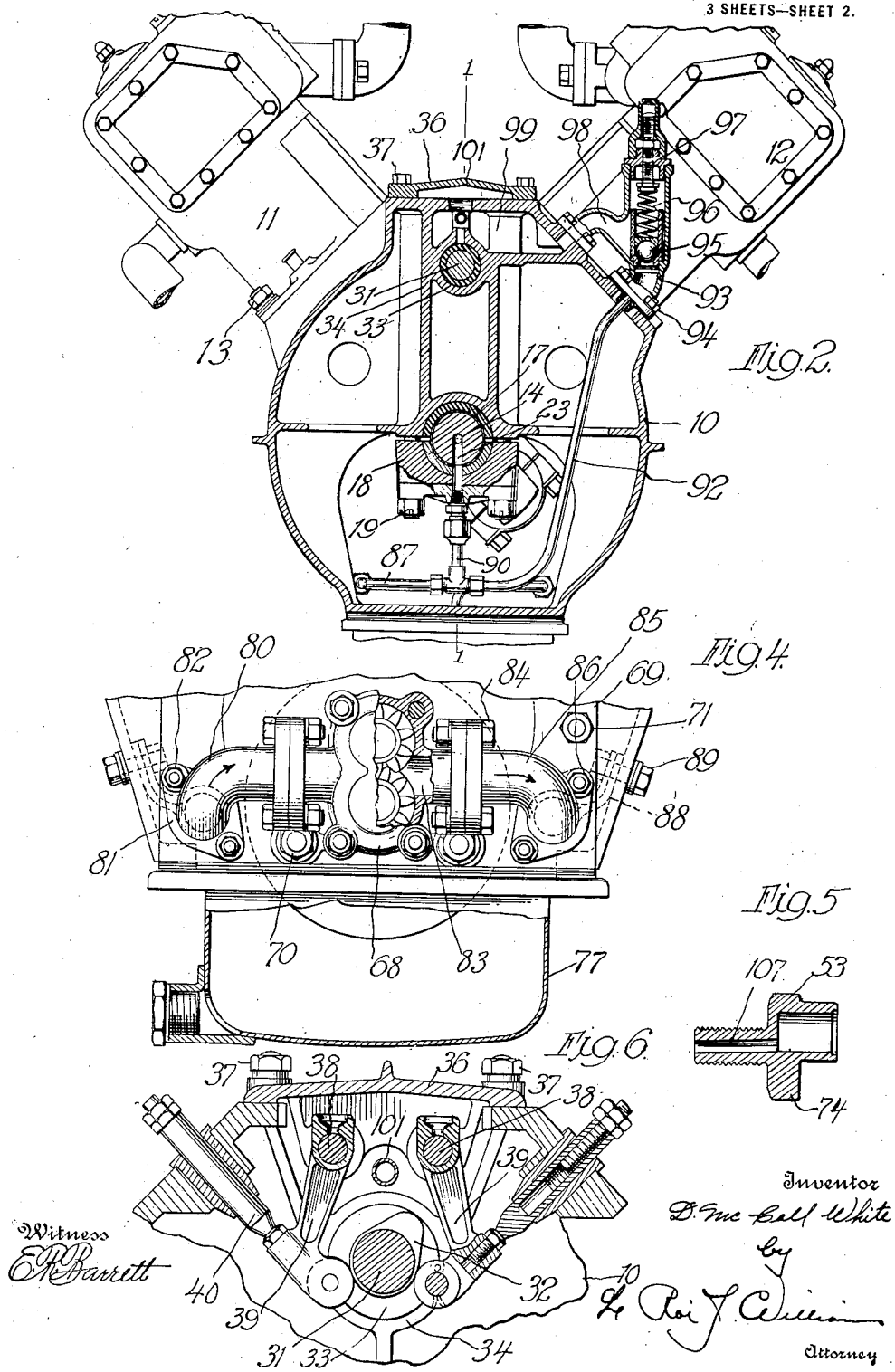

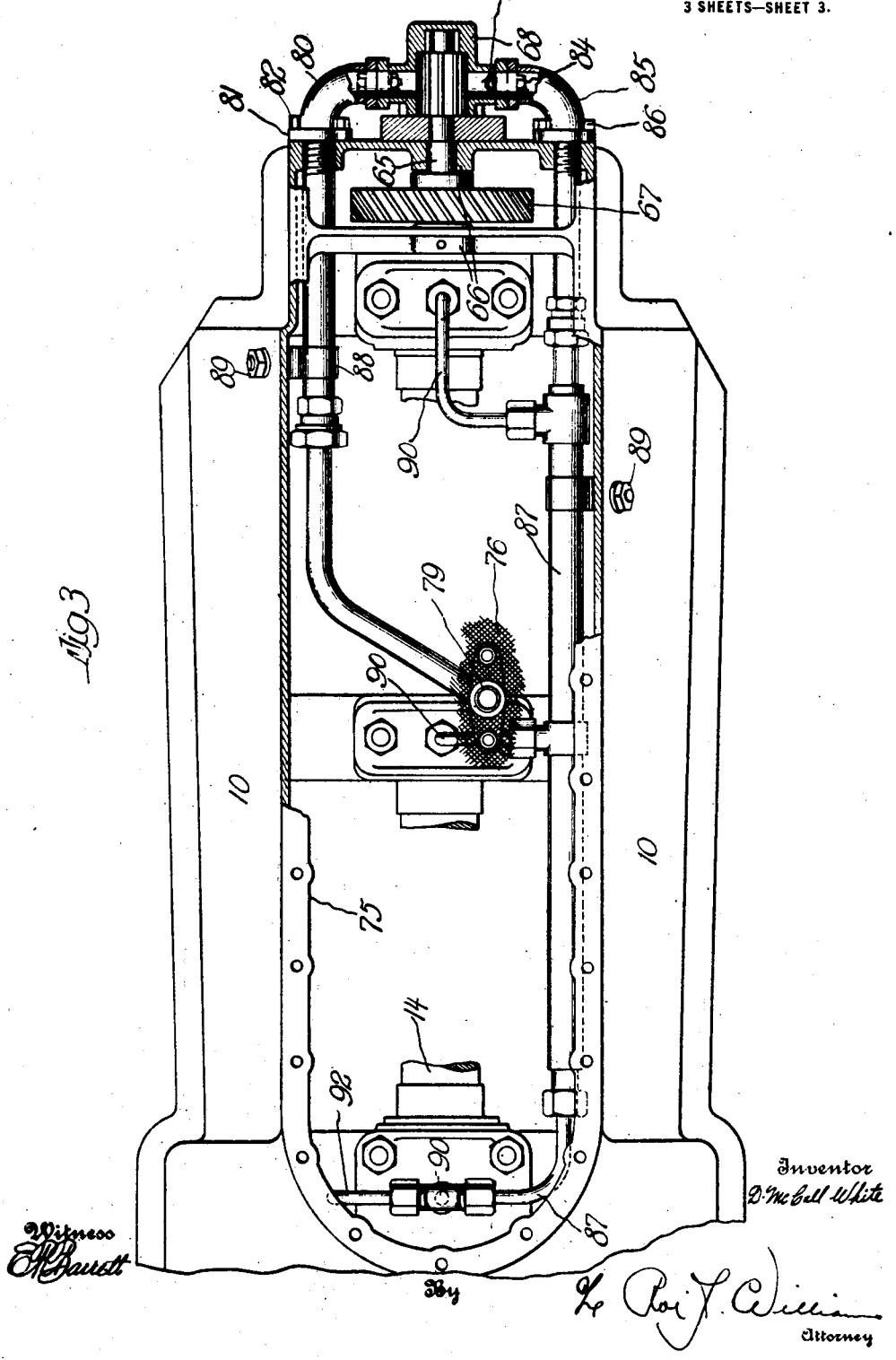

UNITED STATES PATENT OFFICE.

D'ORSAY McCALL WHITE, OF DETROIT, MICHIGAN, ASSIGNOR TO CADILLAC MOTOR CAR COMPANY, OF DETROIT, MICHIGAN, A CORPORATION OF MICHIGAN.

HYDROCARBON-MOTOR.

1,381,150. Specification of Letters Patent. Patented June 14, 1921.

Application filed November 26, 1915. Serial No. 63,469.

*To all whom it may concern:*

Be it known that I, D'ORSAY McCALL WHITE, a loyal subject of the King of England, and resident of Detroit, Wayne county, State of Michigan, have invented certain new and useful Improvements in Hydrocarbon-Motors, of which the following is a specification.

This invention relates to hydrocarbon motors, and particularly to an improved lubricating system, as applied thereto.

One of the objects of this invention is an improved arrangement and disposition of the various parts of the motor, which will result in a more satisfactory and efficient lubrication of the operating mechanisms.

Another object is to provide a lubricating system with improved means for maintaining desired pressures in the system under various operating conditions.

Another object is to provide means for maintaining a desired minimum pressure, as well as a desired maximum pressure in the lubricating system, under certain operating conditions.

These and other objects will appear from the following description, taken in connection with the accompanying drawings, which form a part of this specification, and in which:

Figure 1 is a longitudinal vertical section of a motor substantially on the line 1—1 of Fig. 2, with some parts broken away and others shown in elevation;

Fig. 2 is a transverse vertical section substantially on the line 2—2 of Fig. 1;

Fig. 3 is a bottom view of the crank case, showing various parts of the lubricating system, with parts broken away;

Fig. 4 is a fragmentary front elevation, with parts broken away, of the lower part of the crank case, showing the oil pump and its correlated parts;

Fig. 5 is a sectional view of a detail; and

Fig. 6 is a fragmentary transverse section substantially on the line 6—6 of Fig. 1, showing the cam shaft and associated parts of the valve mechanism operated therefrom.

In the drawings, 10 represents a crank case or motor base, on which may be mounted, in any suitable manner, in V relation, a plurality of cylinder blocks 11 and 12, as by bolts 13. A crank shaft 14, comprising a plurality of throws or cranks 15 may be mounted in three bearings 16, arranged in integral webs of the crank case 10, these bearings comprising a two part journal member 17, sleeved on the shaft, and held in position against rotation by the detachable caps 18, as by bolts 19. It will be understood that each of the journal members 17 is provided with interiorly arranged circumferential grooves 20, provided with ports 21, which are in constant communication with ports 22 formed in the bearing caps 18.

The crank shaft 14 is provided with drilled out portions or channels 23, one end of which is in constant communication with a groove 20 in the journal member 17 and the other end of which is in communication with a journal member 24 arranged on an adjacent crank, the member 24, also having an interiorly arranged distributing groove 25 in registration with the port 25' in the crank shaft.

Suitably arranged on each crank are a pair of connecting rods 26, one of which is provided with bifurcated arms 27, which are adapted to embrace a straight end rod arranged on the journal member 24, intermediate the arms 27. Suitable caps 28 and 29 and bolts 30 maintain the connecting rods in operative relation.

A cam shaft 31, provided with a plurality of cams 32, is mounted in the crank case 10, above the crank shaft 14 in a plurality of bearing members 33, which may be arranged in integral web portions 34 of the crank case, the cam shaft being adapted to be assembled in the crank case by an endwise movement of the shaft which, may be secured in position, as by a bolt 35.

Suitably mounted in a cover plate 36, which may be secured in position, as by bolts 37, are a pair of rods 38, on which may be pivotally mounted a plurality of rocker arms 39, pairs of which are adapted to be operated by each one of the cams 32 and to operate valve tappets 40 of opposite cylinders.

A plurality of gears 45 and 46 may be mounted on the front end of the crank shaft and secured against rotation thereon, by means of a key 47 and bolt 48, the gear 46 being adapted to drive a gear 49 by means, such as a chain 50. The gear 49 and a gear 50', to which the former is secured, as by bolts 51, are fixed on the forward end of the cam shaft 31 in driving relation therewith, as by key 52 and bolt 53.

It will also be understood that another shaft 54 may be arranged in anti-friction bearings 55 in a detachable housing 56, suitably mounted on the upper part of the crank case 10, the shaft 54 having a fan 57 driven from one of its ends, and a gear 58 is arranged on its opposite end adapted to drive a device, such as a pump 59 therefrom, this shaft 54 having a gear 60 secured intermediate its ends, as by a key 61, and is adapted to be driven from the gear 50', as by the chain 62.

Another shaft 63, which may be mounted in bearings, not shown, in the crank case, is arranged below the crank shaft 14 with its axis at right angles thereto, and is provided with a gear 64, which is adapted to mesh with the gear 45 mounted on the crank shaft 14 and to be driven therefrom. A pump shaft 65 is arranged parallel to the crank shaft 14 in suitable bearings 66. The shaft 65 is provided with a gear 67 in mesh with the gear 64, and is adapted to have a driving connection with an oil pump 68, which may be of the well known gear type.

It will be understood that the oil pump 68 may be suitably mounted on a cover plate 69 and maintained in proper position, as by bolts 70, the cover 69 being detachably secured over the gearing at the front end of the crank case, as by bolts 71.

It will be noted that an air pump 72, of the reciprocating type, is mounted in the cover 69 and has its pitman 73 pivotally connected to a cam or crank 74 formed on the bolt 53, and is thus driven therefrom.

The bottom part of the crank case 10 is provided with an opening 75, over which is arranged a screen 76, which may be held in position by means of a cover 77, which is secured in proper position, as by bolts 78, the cover 77 forming an oil well or sump, from which lubricant may be drawn, by means of a conduit 79, which is in communication with the suction pipe 80 of the oil pump 68. The suction pipe 80 may be secured in position on the crank case by means of the flange portions 81 and bolts 82.

The pump casing is formed with a port 83, to which may be connected, as by bolts 84, a discharge pipe 85, which is also connected, as by bolts 86, to a conduit or feeder 87, which runs lengthwise of the crank case and is secured in position therein, as by cleats 88 and bolts 89. It will be understood that the feeder 87 is provided with a plurality of risers 90, each of which is suitably connected, as by the unions 91, with the ports 22, for feeding oil to the respective bearings of the crank shaft 14.

Suitably connected to one end of the feeder 87 is a conduit 92, which leads to a pressure regulator 93, which may be suitably mounted on the crank case 10, as by bolts 94. This pressure regulator may be of any well known type, comprising a valve 95, adapted to be held in closed position by means of a spring 96, the tension of which may be suitably adjusted by means of a bolt 97.

From the foregoing description, it will be seen that when the motor is started, oil is drawn from the oil well in the cover 77 to the pump 68, thence to the feeder 87 and to the various crank shaft journals 17, from which the oil is forced through the channels 23 in the crank shaft 14 to the bearings for the lower ends of the connecting rods, and until the pressure in the system goes above that which the regulator 93 is adjusted for, the oil does not circulate beyond this maximum pressure regulator 93.

However, when the pressure in the lubricating system increases sufficiently to open the valve 95, lubricant is forced at a pressure lower than that in the parts above described, through a port 98 to a pocket or reservoir 99, which is formed in the upper part of the crank case 10, whence lubricant is adapted to be distributed to another part of the motor where the pressure is normally much lower than in the lubricant so far described, and it will be understood from the following description that means are provided for maintaining a minimum pressure in the system after the maximum pressure regulator 93 is opened.

It will be noted that the rear end bearing 33 for the cam shaft is provided with a port 100, which is in constant communication with the pocket 99, from which oil is adapted to be fed when the pressure regulator 93 is opened; also leading from the reservoir 99 is a conduit or channel 101, which is suitably arranged in the web portion 34, this conduit or channel being provided with a plurality of ports 102, one of which communicates with the interior of a bearing member 33 for the cam shaft.

It will also be understood that one end 103 of the conduit is open, providing a port, the area of which ultimately controls the minimum pressure in that part of the oiling system beyond the maximum pressure regulator 93. It will also be understood that lubricant is fed from the port 103 for lubricating the gears arranged at the front end of the motor.

The conduit 101 is also provided with another port 104, which registers with a groove 105 in the front end bearing 33 for the cam shaft, from which groove lubricant may be fed to a drilled out portion 106 of the shaft 31, the lubricant flowing from the channel 106, through the passage 107 formed in the bolt 53 whereby lubricant is fed to a point adjacent the pump 72.

Of course it will be understood from the foregoing description that the oil, which is thrown from the crank shaft, is adapted to lubricate the various parts of the valve mechanisms, such as the cams and rocker arms, as well as the cam shaft bearings, when the motor is not going at a sufficiently high speed to cause the opening of the valve in the maximum pressure regulator, whereby lubricant is positively fed under pressure to the cam shaft bearings.

It will also be understood that after the various parts are lubricated, the oil will flow back to the sump 77, where it will be re-circulated, as has been herein described.

While I have described and illustrated a preferred form of my invention, it will be understood that various modifications and changes will occur, to one skilled in the art, without departing from the spirit and scope of this invention.

Having thus described my invention, what I claim and desire to secure by Letters Patent is:—

1. In a hydrocarbon motor, a crank shaft, a cam shaft; means for constantly supplying a lubricant to said crank shaft and to said cam shaft from a common source; and means for automatically securing a higher pressure of the lubricant supplied to one of said shafts than to the other shaft.

2. In a hydrocarbon motor, the combination with the crank shaft, cam shaft and gearing operated thereby, of means for constantly supplying a lubricant to said parts from a common source, and means for regulating in steps the pressure and quantity of lubricant supplied to said parts.

3. In a hydrocarbon motor lubricating system, means for constantly supplying the crank shaft bearings, the cam shaft bearings, the gearing operated thereby and other parts to be lubricated from a common source in successively reduced pressures and quantities.

4. In a hydrocarbon motor, the combination with the crank case and the crank shaft mounted therein, of a lubricant reservoir, a common supply of lubricant for said crank shaft bearings and said reservoir, means for regulating the comparative pressures and quantities of lubricant supplied said crank shaft bearings and said reservoir respectively, and means for supplying lubricant from said reservoir to other parts of said motor in successively varying quantities and pressures.

5. In a hydrocarbon motor lubricating system, the combination with a common supply of lubricant under pressure, of a plurality of lubricant reservoirs or ducts, means for successively regulating the quantity and pressure fed to each reservoir or duct, and means for feeding said lubricant from said reservoirs or ducts to the various parts of the motor to be lubricated.

6. In a hydrocarbon motor, the combination with a crank case, a shaft mounted in bearings therein, means for feeding lubricant under pressure to said bearings, said shaft having a channel formed therein, a device to be driven, said device having a driving connection with one end of said shaft, said means being adapted to feed lubricant through said channel to said device.

7. In a hydrocarbon motor, the combination with a crank case, a crank shaft mounted therein, said crank case being provided with a gear casing at one end thereof, gearing in said casing, of means for feeding lubricant under pressure to said crank shaft, said means also being adapted to feed lubricant to said gearing when the pressure in said lubricating means rises above a predetermined amount.

8. In a hydrocarbon motor, the combination with a crank case, a crank shaft and a cam shaft mounted in bearings arranged therein, of means for feeding lubricant under pressure to said bearings, said cam shaft having a drilled out portion communicating with one of its bearings, a device driven from said cam shaft, and means communicating with said drilled out portion for feeding lubricant to said device.

In testimony whereof I affix my signature in the presence of two witnesses.

D. McCALL WHITE.

Witnesses:
 F. L. DAVIS,
 RALPH B. BURTON.